United States Patent [19]

Barron

[11] Patent Number: 4,758,604
[45] Date of Patent: Jul. 19, 1988

[54] POLYUREA RIM SYSTEMS HAVING IMPROVED PROCESSIBILITY
[75] Inventor: Benny G. Barron, Lake Jackson, Tex.
[73] Assignee: The Dow Chemical Company, Midland, Mich.
[21] Appl. No.: 35,682
[22] Filed: Apr. 7, 1987
[51] Int. Cl.$^4$ ............................................. C08G 18/40
[52] U.S. Cl. .................................... 521/125; 521/163; 521/164; 521/172; 521/174; 528/55; 528/61; 528/64; 528/66; 528/76; 264/51
[58] Field of Search .................. 264/51, 125; 521/163, 521/164, 172, 174; 528/55, 61, 64, 66, 76

[56] References Cited

U.S. PATENT DOCUMENTS

| | | |
|---|---|---|
| 4,444,910 | 4/1984 | Rice et al. |
| 4,487,908 | 12/1984 | Dominguez |
| 4,487,912 | 12/1984 | Zimmerman et al. |
| 4,499,254 | 2/1985 | Dominguez et al. |
| 4,513,133 | 4/1985 | Dominguez |
| 4,519,965 | 5/1985 | Taylor et al. ........................ 521/125 |
| 4,530,941 | 7/1985 | Turner et al. |
| 4,585,803 | 4/1986 | Nelson et al. |
| 4,642,320 | 2/1987 | Turner et al. |

FOREIGN PATENT DOCUMENTS 81701 6/1983 European Pat. Off.

*Primary Examiner*—John Kight
*Assistant Examiner*—S. A. Acquah

[57] ABSTRACT

This invention is an active hydrogen-containing composition comprising (A) a relatively high equivalent weight liquid active hydrogen-containing material or mixture thereof having at least 50% of its active hydrogen containing groups in the form of primary and/or secondary amine groups;

(B) a chain extender having an equivalent weight of about 31 to about 250 and about 2 active hydrogen-containing groups per molecule; and (C) from about 1 to about 30 parts, per 100 parts by weight of the composition, of an amide formed by the reaction of a $C_2$–$C_{30}$ monocarboxylic acid with a relatively high equivalent weight amine-terminated polyether.

28 Claims, No Drawings

POLYUREA RIM SYSTEMS HAVING IMPROVED PROCESSIBILITY

BACKGROUND OF THE INVENTION

This invention relates to polyurea or polyurea-polyurethane polymers prepared in a reaction injection molding (RIM) process.

Polyurethane elastomers are increasingly being made from fast-reacting precursor materials in a reaction injection molding (RIM) process. The RIM process has the advantages of cycle times of the order of three minutes or less and the ability to handle highly reactive precursor materials which cannot be processed using conventional casting processes. The use of these precursor materials is especially advantageous as they give rise to desirable properties in the product.

Recently, the hydroxyl-containing materials used in RIM systems have been gradually replaced with primary or secondary amine-containing materials. These amines react with a polyisocyanate to form a polyurea or polyurea-polyurethane polymer. The urea groups have been related to improved thermal properties, especially improved heat distortion. This property is particularly important in making automobile body parts, which is the primary application of the RIM process. The process used for painting these parts requires baking at a temperature of up to 400° F. Polyurea and polyurea-polyurethane polymers withstand these temperatures with much less distortion than polyurethanes.

A major disadvantage of the polyurea and polyurea-polyurethane systems is that, in order to obtain good physical properties, it is necessary to employ very high mold temperatures, such as about 260°-325° F. At least three problems are associated with the use of such high mold temperatures. First, the energy consumption is much greater than that required at lower mold temperatures. Second, the higher temperatures make the parts much harder to handle at demold. Since the parts must usually be demolded by hand, and the mold treated at least occasionally between successive moldings, the higher temperatures make these operations less comfortable to work in and increase the risk of significant injury. Third, at these high temperatures, the best performing internal mold release agents, the metal carboxylates, tend to perform more poorly.

For these reasons, it would be desirable to provide a polyurea or polyurea-polyurethane system which is processable using relatively low mold temperatures, but which provides a polymer having excellent physical properties.

SUMMARY OF THE INVENTION

This invention is, in one aspect, an active hydrogen-containing composition comprising (A) a relatively high equivalent weight liquid active hydrogen-containing material or mixture thereof having at least 50% of its active hydrogen containing groups in the form of primary and/or secondary amine groups;

(B) a chain extender having an equivalent weight of about 31 to about 250 and about 2 active hydrogen-containing groups per molecule; and (C) from about 1 to about 30 parts, per 100 parts by weight of the active hydrogen-containing composition, of an amide formed by the reaction of a $C_2$–$C_{30}$ monocarboxylic acid with a relatively high equivalent weight amine-terminated polyether.

In another aspect, this invention is a process for preparing a polyurea or polyurea-polyurethane polymer comprising reacting the active hydrogen-containing composition of this invention with a polyisocyanate in a closed mold using a RIM process.

In a third aspect, this invention is a polyurea or polyurea-polyurethane polymer which is prepared in the reaction, in a closed mold, of a polyisocyanate with the active hydrogen-containing composition of this invention.

Using the composition of this invention, a polyurea or polyurea-polyurethane polymer can be prepared having excellent physical properties using a mold temperature which is lower than that required in conventional polyurea or polyurea-polyurethane systems. Typically, mold temperatures of about 180° to about 250° F. can be employed, as opposed to temperatures of about 250°-325° F. required in conventional processes. In addition to the reduced energy requirements and easier handling of the molded parts at demold, the use of the lower mold temperatures allows metal carboxylate internal mold release agents such as zinc stearate to perform efficiently.

DETAILED DESCRIPTION OF THE INVENTION

One critical component of the active hydrogen-containing composition is a relatively high equivalent weight liquid active hydrogen-containing material or mixture thereof having at least 50% of its active hydrogen containing groups in the form of primary and/or secondary amine groups. The material advantageously contains about 2 to about 6, preferably about 2 to about 3 primary and/or secondary amine groups per molecule, and advantageously has an equivalent weight from about 500 to about 5000, preferably about 700 to about 2500, more preferably about 1000 to about 2000. By "equivalent weight", it is meant the molecular weight divided by the number of active hydrogen-containing groups.

Any compound or polymer can be used as the relatively high equivalent weight active hydrogen-containing material if it has a desirable functionality and equivalent weight, and contains no substituent groups which undesirably interfere with its ability to react with a polyisocyanate to form a polymer. Preferably, however, an amine-terminated polyether or polyester, especially an amine-terminated polyether is used. Especially preferred amine-terminated polyethers are polymers of propylene oxide and/or ethylene oxide which are terminated with primary and/or secondary amine groups. Such amine-terminated polyethers can be prepared, for example, from the corresponding polyether polyol by reacting it with ammonia or a primary amine in a reductive amination as taught in U.S. Pat. No. 4,152,353. Alternatively, the amine-terminated polyether can be prepared by reacting the corresponding polyether polyol with o- or p-nitro chlorobenzene and subsequently reducing the nitro groups to amine groups. Secondary amine-terminated polyethers can be prepared by reductively aminating the corresponding polyether polyol and reacting the resulting primary amine groups with acrylonitrile or other unsaturated compound which undergoes a Michael addition reaction with a primary amine.

In most of the synthetic methods for making amine-terminated polyethers, the amination does not go to completion. Accordingly, it is within the scope of this invention to use materials in which about 50–100%, preferably about 60–95% of the hydroxyl groups have been converted to amine groups. It is also within this invention to employ a small quantity of a relatively high equivalent weight polyol, as long as at least 50% of the total number of active hydrogen-containing groups provided by the relatively high equivalent materials are amine groups.

A second critical component is a chain extender. The term "chain extender" is used herein to denote a material having about 2 active hydrogen-containing groups per molecule and an equivalent weight from about 30 to about 250, preferably about 31 to about 150.

Hydroxyl-terminated compounds which are suitable as chain extenders include ethylene glycol, diethylene glycol, triethylene glycol, propylene glycol, dipropylene glycol, tripropylene glycol, 1,4-butane diol, hydroquinone, catechol, tetraethylene glycol, dicyclopentadienediethanol, cyclohexanedimethanol, and the like. Ethylene glycol, cyclohexanedimethanol and 1,4-butane diol are preferred.

Preferred chain extenders are aromatic amine chain extenders. These include, for example, 2,4'bis(p-aminobenzyl)aniline, 2,4- and/or 2,6-diaminotoluene, 1,3- and/or 1,4-phenylenediamine, 2,4'- and/or 4,4'-diaminodiphenylmethane, naphthylene-1,5-diamine, 1-methyl-2-methylamino-4-aminobenzene, 1,3-diethyl-2,4-diaminobenzene, 2,4-diaminomesitylene, 1,3,5-triethyl-2,6-diaminobenzene, the 2,4- and 2,6-isomers of diethyltoluenediamine (DETDA) and the like. The most preferred aromatic amine chain extender is an isomeric mixture of DETDA.

Aliphatic diamines which are useful herein include ethylene diamine, 1,3-diaminopropane, 1,4-diaminobutane, isophorone diamine, aminoethylpiperazine, and the like.

Aminated polyethers having a functionality of about 2 and an equivalent weight up to about 250 are also useful herein.

Mixtures of an aromatic amine chain extender and an aminated polyether are preferred, as are mixtures of a glycol chain extender and an aminated polyether, and mixture of an aromatic amine chain extender and cyclohexanedimethanol. DETDA and mixtures thereof with cyclohexane dimethanol or an aminated polyether are most preferred.

The amount of chain extender used depends somewhat on the desired stiffness (flexural modulus) of the polymer. Using increasing amounts of chain extender tends to increase the flexural modulus of the polymer. Advantageously, about 5 to about 200, preferably about 15 to about 60, more preferably about 20 to about 55 parts by weight of chain extender are used per 100 parts by weight of the relatively high equivalent weight material. Amounts of chain extender in excess of about 70 parts per 100 parts relatively high equivalent weight material are ordinarily used in two-step processes for making polyureas or polyurea-polyurethanes.

Another critical component of the active hydrogen-containing composition is an amide formed by the reaction of a $C_2$–$C_{30}$ monocarboxylic acid, or mixture of monocarboxylic acids having an average of about 2 to about 30 carbon atoms per molecule, with a relatively high equivalent weight amine-terminated polyether. The amine-terminated polyether is advantageously as described before. The $C_2$–$C_{30}$ monocarboxylic acid advantageously has a structure represented as:

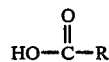

wherein R is a $C_2$–$C_{29}$ unsubstituted or inertly substituted hydrocarbyl group, preferably a $C_5$–$C_{23}$ saturated or unsaturated aliphatic hydrocarbyl group, more preferably a linear $C_7$–$C_{17}$ saturated or unsaturated aliphatic hydrocarbyl group. The group R may also be an alkylphenyl group, preferably wherein the alkyl groups contain about 4 to about 12 carbon atoms, or a poly(oxyalkylene) substituted phenyl group having up to 30 carbon atoms. Suitable acids include caprylic acid, capric acid, myristic acid, palmitic acid, palmitoleic acid, stearic acid, oleic acid, lauric acid, linoleic acid, linolenic acid, α-eleostearic acid, ricinoleic acid, behenic acid, montanic acid, octylbenzoic acid, decylbenzoic acid, docecylbenzoic acid, oleoyl sarcosine, stearoyl sarcosine, and the like.

In making the amide, the amine-terminated polyether and the acid are advantageously reacted together at an elevated temperature until substantially all of the acid groups have reacted. A stoichiometric excess of the amine-terminated polyether can be used. The reaction can be monitored by techniques including infrared spectroscopy or determination of an acid number to determine when substantially all of the acid groups have been consumed. Preferably, the amide as an acid number of less than 30, preferably less than about 15.

In a preferred method of making the amide when the amine-terminated polyether is also component (A) of the active hydrogen-containing composition, a small quantity of the acid is added to the amine terminated polyether to form the amide in situ.

About 1 to about 30, preferably about 2 to about 20, more preferably about 3 to about 11, parts by weight of the amide are advantageously used per 100 parts by weight of the relatively high equivalent weight material. The use of greater amounts tends to diminish the properties of the polymer by a plasticization effect, whereas smaller amounts tend not to provide the desired improvements in processing.

Although not required, a significant additional benefit of this invention is realized when a metal carboxylate internal mold release agent is used in making the polyurea or polyurethane polymer. Suitable metal carboxylates are described in U.S. Pat. No. 4,585,803, incorporated herein by reference. Preferred are zinc, calcium, cadmium, lithium or nickel salts of fatty acids or amidocontaining acids. Especially preferred are zinc salts of fatty acids. Exemplary salts include zinc stearate, zinc laurate, zinc oleate, zinc palmitate, cadmium stearate, cadmium laurate, cadmium oleate, cadmium palmitate, calcium stearate, calcium laurate, calcium oleate, calcium palmitate, lithium stearate, lithium laurate, lithium oleate, lithium palmitate, nickel stearate, nickel laurate, nickel oleate, nickel palmitate and the like. Of these zinc stearate and zinc laurate are most preferred. Such salts, when present, are typically used in amount from about 0.5 to about 5, preferably about 1 to about 3 parts per 100 parts by weight of the active hydrogen-containing composition.

Although the metal carboxylate internal mold release agent is usually compatible with the relatively high equivalent weight active hydrogen-containing materials used in this invention, it may be desirable or in some instances necessary to employ a compatibilizer for the metal carboxylate in order to improve its solubility in the composition. Such compatibilizers include primary amine-containing materials, especially primary aliphatic amines, and amine-initiated polyethers. Preferred compatibilizers include low equivalent weight amine-terminated polyethers, and low equivalent weight ethylene oxide and/or propylene oxide derivatives of ammonia or ethylene diamine. These and other compatibilizers are described in U.S. Pat. No. 4,530,941 and copending application Ser. No. 570,141, incorporated by reference.

In making a polyurea or polyurea-polyurethane, the active hydrogen-containing composition is reacted with a polyisocyanate. The polyisocyanate may be aromatic or aliphatic, and must have an average of at least two reactive isocyanate groups per molecule.

Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}$MDI), isophorone diisocyanate, and the like.

Suitable aromatic polyisocyanates include, for example, 2,4- and or 2,6-toluene diisocyanate (TDI), 1,3- and 1,4-phenylene diisocyanate, 2,4'- and/or 4,4'-diphenylmethane diisocyanate (including mixtures thereof)(MDI), 1,5-naphthylene diisocyanate, triphenylmethane-4,4',4''-triisocyanate, polyphenylpolymethylene polyisocyanates, and the like. When polyisocyanates such as these, especially MDI and its derivatives, are used, it is preferred that the amine-terminated compound be substantially difunctional, i.e. have an average functionality of about 1.5 to about 2.2, preferably about 1.8 to about 2.1, more preferably about 1.9 to about 2.05.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and/or urethane groups and have an equivalent weight of about 130–150 are of particular significance. In addition, "soft segment" prepolymers having an equivalent weight of about 190 to about 250, which are prepared by reacting MDI or TDI with a 1000–2500 equivalent weight polyether polyol are of particular significance.

Of the foregoing polyisocyanates, TDI, MDI, isophorone diisocyanate, $H_{12}$MDI, hexamethylenediisocyanate, cyclohexane diisocyanate and derivatives thereof are preferred due to their cost, commercial availability and performance.

In addition to the foregoing components, other optional components including catalysts, colorants, surfactants, blowing agents, fillers, fibers, flame retardants and the like may be used in the practice of this invention. These components are generally, but not necessarily, blended into the active hydrogen-containing composition prior to its reaction with the polyisocyanate.

Because of the use of aminated relatively high equivalent weight materials, it is not necessary to use a catalyst with this invention. However, catalysts can be used if desired. Although a wide variety of materials are known to be useful for this purpose, the most widely used and preferred catalysts are the tertiary amine catalysts and the organometallic catalysts, especially the organotin catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.1 to about 2 parts per 100 parts by weight of the amine-terminated compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.1 part by weight of an organometallic catalyst is used per 100 parts of amine-terminated compound.

Blowing agents may be used to reduce the density of the polyurea or polyurea-polyurethane. The blowing agent is any material which is capable of generating a gas under the conditions of the reaction of a polyisocyanate and a polyol. Such materials include air, carbon dioxide, nitrogen, water, low-boiling halogenated alkanes, finely divided solids, the so-called "azo" blowing agents such as azobis(formamide) and the like. Preferred are water, the low-boiling halogenated alkanes, or mixtures thereof. In making microcellular elastomers having a density of 0.8 g/cc or higher, the desired density can be obtained by a process commonly referred to as nucleation, wherein air or nitrogen is bubbled through the active hydrogen-containing composition prior to its reaction with the polyisocyanate.

A cell control agent is often used in conjunction with a blowing agent to control the formation of cells. Suitable surfactants include siloxane/poly(alkylene oxide) copolymers as described, for example, in U.S. Pat. Nos. 3,887,500 and 3,957,842. The selection and use of such surfactants in preparing foams is well known in the art.

Suitable fillers and fibers include titanium dioxide, calcium carbonate, carbon black, kaolin, wollastonite, aluminum trihydrate, milled glass, fiber glass, polyester fibers, graphite fibers, polyamide fibers, and the like.

In making a noncellular or microcellular polyurethane elastomer according to a one-shot process, the active hydrogen-containing composition of this invention is mixed with the polyisocyanate and transferred into a suitable mold before substantial curing occurs. Due to the high reactivity of the components, an apparatus such as a reaction injection molding machine is advantageously and preferably used to mix the polyisocyanate with the other components and inject the mixture into the mold. The components may be preheated to a temperature of about 70° to about 150° F. prior to mixing, if desired. The mold itself is advantageously preheated to a temperature of at least about 150°, preferably at least about 180°, more preferably at least about 200° F., up to about 300°, preferably up to about 250°, more preferably up to about 230° F. when the reaction mixture is injected. It is a primary advantage of this invention that lower (i.e., less than about 250° F.) mold temperatures can be used and moldings having excellent physical properties are obtained.

The residence time in the mold is sufficient to permit the polymer to cure to a state where it can be demolded without permanent physical distortion. The polymer can usually be demolded from about 15 seconds to about 5 minutes, preferably about 15 to about 60 seconds after the reaction mixture is injected. Following demolding, it is often desirable to postcure the molding at a temperature from about 200° to about 350° F. for a period of about 30 minutes to about 24 hours to further improve the properties.

The polyurea or polyurea-polyurethane of this invention invention is useful for making elastomeric articles having flexural moduli from about 5,000 to about 500,000 psi, which are useful in a variety of applications, including automobile bumpers, beer keg skirts, window gaskets, automobile body parts, and the like.

The following examples are provided to illustrate the invention but are not intended to limit the scope thereof. All parts and percentages are by weight unless otherwise indicated.

EXAMPLE 1

In a suitable container are blended 65.1 parts zinc stearate and 14.1 parts oleic acid. To this blend is added a mixture of 131.3 parts of a trifunctional, 5000 molecular weight poly(propylene oxide) having about 90% of its terminal hydroxyl groups converted to primary amine groups (Amine-terminated polyether A), 66.6 parts of an isomeric mixture of diethyltoluenediamine (DETDA), and 2 parts of a silicone surfactant. The resulting mixture is heated to 140° C. until a solution is formed, and then for an additional 10 minutes to allow the oleic acid to react with part of Amine-terminated polyether A. Completeness of the reaction is determined by infrared spectroscopy, which indicates no measurable amount of acid. The mixture is then added to a mixture of 1786 parts of Amine-terminated polyether A, 906.8 parts of DETDA and 28 parts of the silicone surfactant to form an active hydrogen-containing composition suitable for RIM processing.

A series of moldings are made by reacting this composition with a soft segment MDI prepolymer having an equivalent weight of about 202, at a 103 index using a Hi-Tech mini-RIM machine. The temperature of the active hydrogen-containing composition and the polyisocyanate are 135° F. The mold is a 6"×6"×⅛" plaque mold which is preheated to 230°–235° F. The mold is equipped with a device to measure the force, in pounds, required to open the mold. Prior to making the first molding, the interior surfaces of the mold are initially conditioned with an aqueous fluorocarbon wax dispersion external mold release agent. Demold time is 15–25 seconds in all cases.

Sixteen consecutive moldings are made, which require an average force of 1.8 pounds to demold. Without cleaning or otherwise treating the mold, an additional 17 consecutive moldings are made, in which the force required to demold the part varies from 2 to 21 pounds, with an average of 12 pounds. In all cases, the release is considered good to excellent, and the parts have good surface appearance. After the 33rd molding, the flash area of the mold is scraped to remove polymer deposits, and an additional 9 moldings are made before significant problems are encountered in demolding. The physical properties of a typical molding are as reported in Table 1 following (Sample No. 1).

For comparison, a similar formulation is prepared and molding, except the amide is omitted. At a 235° F. mold temperature, the parts are too brittle to demold without breaking, and physical properties cannot be measured.

As an added comparison, molding are made at a mold temperature of about 248° F. from a formulation containing 35.3 parts of Amine-terminated Polyether A, 17.9 parts of DETDA, 0.55 parts of a silicone surfactant and 46.3 parts of the soft segment prepolymer. Due to the lack of an internal mold release agent, an external mold release is applied to the mold before each molding. The physical properties of a typical molding are as reported in Table 1 following (Comparative Sample A).

TABLE 1

| Property | Sample No. 1 | A* |
|---|---|---|
| Mold Temperature, °F. | 230–235 | 248 |
| Specific Gravity | 1.1194 | 1.1237 |
| Tensile Strength[1], psi | 4255 | 4042 |
| Elongation[1], % | 153 | 93 |
| Flexural Modulus[2], psi | 103,880 | 95,639 |
| Heat Sag[3], mm | 5 | 1 |
| Tear Strength[4], lb/in | 304 | 539.5 |
| Notched Izod[5], −20°F. | 23.5 | 38.3 |
| Notched Izod[5], R.T. | 40.7 | 40.2 |
| Gardner Impact[6], R.T., in/lb | >320 | pass 280 fail 288 |

[1]ASTM D-412.
[2]ASTM D-790, room temperature.
[3]ASTM D-3769, at 325° F. for one hour with 4" overhang.
[4]Die C, ASTM D-470C.
[5]ASTM D-256
[6]ASTM D-3029

The data in Table 1 shows that the physical properties of the molding made according to this invention are substantially equivalent to those of a control made at a higher mold temperature without the amide or an internal mold release. From this data it is concluded that the use of an amide and an internal mold release agent permits the use of lower mold temperatures to obtain good releasability and substantially equivalent physical properties.

EXAMPLE 2

An active hydrogen-containing composition like that described in Example 1 is prepared, except 19.35 parts of montanic acid are substituted for the oleic acid used in Example 1. This composition is used to make moldings as described in Example 1. Forty-six consecutive moldings are made without cleaning the mold. The force required to demold the parts averages 11 pounds, with forces greater than 20 pounds required for only 4 moldings. The release is considered good or excellent in all cases.

After the 46th molding, the mold temperature is raised to about 250° F. No cleaning of the mold is done. About 17 additional moldings are made. The release is considered acceptable for all but two of the moldings.

One plaque which is molded at 230°–235° F. and one which is molded at 250° F. are postcured for one hour at 325° F. and subjected to physical property testing, to determine the effect of mold temperature. The results of this testing are as indicated in Table 2 following.

TABLE 2

| Property | Mold Temperature | |
|---|---|---|
| | 230–235° F. | 250° F. |
| Specific Gravity | 1.1212 | 1.12077 |
| Tensile Strength[1], psi | 4110 | 4029 |
| Elongation[1], % | 35 | 34 |
| Flexural Modulus[2], psi | | |
| room temperature | 105,898 | 111,277 |
| −20° F. | 162,280 | 159,793 |
| Heat Sag[3], mm | 4 | 3 |
| Tear Strength[4], lb/in | 668 | 590 |
| Notched Izod[5], −20° F. | 40.3 | 35.1 |
| Gardner Impact[6], −20° F., in/lb | 56 | 58 |

[1] ASTM D-412
[2] ASTM D-790
[3] ASTM D-3769, at 325° F. for one hour with 4" overhang
[4] ASTM D-470C
[5] ASTM D-256
[6] ASTM D-3029

As can be seen from the data presented in Table 2, the moldings made at lower temperature have properties equivalent or superior to those of the molding made at 250° F.

EXAMPLE 3

In a suitable flask are mixed 58.05 g of montanic acid and 250 g of Amine-terminated polyether A. This mixture is heated to 150° C. for a time sufficient to convert all of the acid groups to the amide. Then, 65.1 g of zinc stearate are added to the amide mixture, and heated to 150° C. A 100-g portion of DETDA is added, followed by heating to 140° C. The resulting mixture is then added to a mixture of 767.2 g DETDA, 1707.9 g Amine-terminated Polyether A and 30 g a silicone surfactant. Thirteen consecutive moldings are made using the resulting mixture, using the general conditions described in Example 1, using a mold temperature of 248° F., followed by an additional 52 moldings using a mold temperature of 224° F. Excellent release of all moldings is obtained. The mold is then cleaned and a solution of zinc stearate in water and acetone is applied to its interior surfaces as an external mold release agent. Seventeen consecutive moldings are then made, requiring an average force of 1.6 pounds to open the mold, with the force required to open the mold not exceeding 3.5 pounds in any instance. The physical properties of a plaque molded at 248° F. and one molded at 224° F. are found to be as reported in Table 3 which follows Example 4. The physical properties of the molding made using a mold temperature of 248° F. are substantially the same as those made at a mold temperature of 224° F.

EXAMPLE 4

Example 1 is repeated, this time using 42.3 parts of oleic acid in place of the montanic acid. In this experiment, the mold is treated before making moldings by applying a solution of zinc stearate in water and acetone as an external mold release agent. Seven consecutive moldings are prepared at a mold temperature of 224° F. Excellent release and green strength are obtained. The mold temperature is reduced to 207° F., and 98 additional moldings are made. All exhibit excellent release and good green strength. The last 35 moldings require an average force of 3.66 pounds to open the mold. The physical properties of a plaque molded at 207° F., without post-curing and after post-curing for one hour at 325° F., are as reported in Table 3 following. Excellent physical properties are obtained.

TABLE 3

| Property | Example No. | | | |
|---|---|---|---|---|
| | 3 | 3 | 4 (no post-cure) | 4 (post-cure) |
| 1 Mold Temperature, °F. | 248 | 224 | 207 | 207 |
| Tensile Str.[1], psi | 3965 | 4119 | 4288 | 5026 |
| Elongation[1], % | 97 | 96 | 169 | 160 |
| 1 Flex. Modulus[2], psi | | | | |
| room temperature | 99,000 | 101,400 | 100,100 | 99,000 |
| −20° F. | 160,700 | 179,600 | 159,000 | 163,400 |
| 2 Heat Sag[3], mm | N.D. | 2 | 6 | 2 |
| Tear Strength[4], lb/in | N.D. | 668 | 613 | 685 |
| Notched Izod[5], −20° F. | N.D. | 40.3 | 21.6 | 36.6 |
| 2 Gardner Impact[6], −20° F., in/lb | N.D. | N.D. | 32 | >320 |

N.D. means not determined. [1-6] Same as [1-6] in Table 2.

The data in Table 3 illustrate that lower mold temperatures can be used with this invention to obtain a molding having good physical properties.

What is claimed is:

1. An active hydrogen-containing composition comprising
   (A) a relatively high equivalent weight liquid active hydrogen-containing material or mixture thereof having at least 50% of its active hydrogen containing groups in the form of primary and/or secondary amine groups;
   (B) a chain extender having an equivalent weight of about 31 to about 250 and about 2 active hydrogen-containing groups per molecule; and
   (C) from about 1 to about 30 parts, per 100 parts by weight of the active hydrogen-containing composition, of an amide formed by the reaction of a $C_2$–$C_{30}$ monocarboxylic acid with a relatively high equivalent weight amine-terminated polyether.

2. The composition of claim 1 wherein component (A) comprises a primary or secondary amine-terminated polyether having an equivalent weight from about 700 to about 2500.

3. The composition of claim 2 wherein component (C) comprises an amide formed by the reaction of a $C_6$–$C_{24}$ aliphatic monocarboxylic acid and an excess of a primary or secondary amine-terminated polyether having an equivalent weight from about 700 to about 2500.

4. The composition of claim 3 wherein component (C) comprises about 2 to about 20 parts per 100 parts of the active hydrogen-containing composition.

5. The composition of claim 4 wherein component (C) comprises an amide formed by the reaction of a $C_8$–$C_{18}$ linear saturated or unsaturated aliphatic monocarboxylic acid and an excess of a primary or secondary amine-terminated polyether having an equivalent weight from about 700 to about 2500.

6. The composition of claim 5 wherein component (C) comprises an amide formed by the reaction of a $C_8$–$C_{18}$ fatty acid and an aliphatic primary amine-terminated polyether having an equivalent weight from about 1000 to about 2000 and a functionality from about 2 to about 3.

7. The composition of claim 6 wherein the $C_8$–$C_{18}$ fatty acid is stearic acid, oleic acid, lauric acid, linoleic acid or palmitic acid.

8. The composition of claim 6 wherein component (C) comprises about 3 to about 11 weight percent of the active hydrogen-containing composition.

9. The composition of claim 6 wherein component (B) comprises an aromatic amine chain extender.

10. The composition of claim 9 wherein component (A) comprises a primary aromatic amine-terminated polyether having an equivalent weight from about 1000 to about 2000 and a functionality of about 2 to about 3.

11. The composition of claim 9 wherein component (A) comprises a primary or secondary amine-terminated polyether having an equivalent weight from about 1000 to about 2000 and a functionality of about 2 to about 3.

12. The composition of claim 1 or 9 further comprising an internal mold release agent.

13. The composition of claim 12 wherein the internal mold release agent comprises a zinc carboxylate.

14. A process for preparing a polyurea or polyurea-polyurethane polymer comprising reacting an active hydrogen-containing composition with a polyisocyanate in a closed mold using a RIM process, wherein the active hydrogen-containing composition comprises
    (A) a relatively high equivalent weight liquid active hydrogen-containing material or mixture thereof having at least 50% of its active hydrogen containing groups in the form of primary and/or secondary amine groups;
    (B) a chain extender having an equivalent weight of about 31 to about 250 and about 2 active hydrogen-containing groups per molecule; and
    (C) from about 1 to about 30 parts, per 100 parts by weight of the active hydrogen-containing composition, of an amide formed by the reaction of a $C_2$–$C_{30}$ monocarboxylic acid with a relatively high equivalent weight amine-terminated polyether.

15. The process of claim 14 wherein component (A) comprises a primary or secondary amine-terminated polyether having an equivalent weight from about 700 to about 2500.

16. The process of claim 15 wherein component (C) comprises an amide formed by the reaction of a $C_8$–$C_{18}$ fatty acid and an aliphatic primary amine-terminated polyether having an equivalent weight from about 1000 to about 2000 and a functionality from about 2 to about 3.

17. The process of claim 16 wherein component (C) comprises about 3 to about 11 weight percent of the active hydrogen-containing composition.

18. The process of claim 17 wherein component (B) comprises an aromatic amine chain extender.

19. The process of claim 14 or 18 further comprising an internal mold release agent.

20. The composition of claim 19 wherein the internal mold release agent comprises a zinc carboxylate.

21. A polyurea or polyurea-polyurethane polymer which is prepared in the reaction, in a closed mold, of a polyisocyanate with an active hydrogen-containing composition comprising:
    (A) a relatively high equivalent weight liquid active hydrogen-containing material or mixture thereof having at least 50% of its active hydrogen containing groups in the form of primary and/or secondary amine groups;
    (B) a chain extender having an equivalent weight of about 31 to about 250 and about 2 active hydrogen-containing groups per molecule; and
    (C) from about 1 to about 30 parts, per 100 parts by weight of the active hydrogen-containing composition, of an amide formed by the reaction of a $C_2$–$C_{30}$ monocarboxylic acid with a relatively high equivalent weight amine-terminated polyether.

22. The polymer of claim 21 wherein component (A) comprises a primary or secondary amine-terminated polyether having an equivalent weight from about 700 to about 2500.

23. The polymer of claim 22 wherein component (C) comprises an amide formed by the reaction of a $C_8$–$C_{18}$ fatty acid and an aliphatic primary amine terminated polyether having an equivalent weight from about 1000 to about 2000 and a functionality from about 2 to about 3.

24. The polymer of claim 23 wherein component (C) comprises about 3 to about 11 weight percent of the active hydrogen-containing composition.

25. The process of claim 24 wherein component (B) comprises an aromatic amine chain extender.

26. The process of claim 21 or 25 further comprising an internal mold release agent.

27. The composition of claim 26 wherein the internal mold release agent comprises a zinc carboxylate.

28. An active hydrogen-containing composition comprising:
    (A) an amine-terminated polyether having an equivalent weight of about 1000 to about 2000 and about 3 primary and/or secondary amine groups per molecule;
    (B) about 20 to about 55 parts of an aromatic amine chain extender per 100 parts by weight of component (A);
    (C) about 3 to about 11 parts, based on the weight of the composition, of an amide formed in the reaction of an amine-terminated polyether having an equivalent weight of about 1000 to about 2000 and about 3 primary and/or secondary amine groups per molecule an a $C_8$–$C_{18}$ fatty acid; and
    (D) about 0.5 to about 5 parts, based on the weight of the composition, of zinc stearate or zinc laurate.

* * * * *